Nov. 19, 1968   M. SORENSEN   3,411,298
PRESSURE TRANSFER APPARATUS

Filed Sept. 22, 1966                2 Sheets-Sheet 1

INVENTOR
Max Sorensen

BY Hastings Ackley
and
Walter J. Jagmin
ATTORNEYS

INVENTOR
Max Sorensen

United States Patent Office 3,411,298
Patented Nov. 19, 1968

3,411,298
PRESSURE TRANSFER APPARATUS
Max Sorensen, 4256 Park Lane,
Dallas, Tex. 75220
Filed Sept. 22, 1966, Ser. No. 581,378
18 Claims. (Cl. 60—54.5)

ABSTRACT OF THE DISCLOSURE

A pressure transfer apparatus for transmitting fluid pressure from one pressure source to one or more independent fluid pressure systems without direct fluid communication between the systems and with the pressure source. A modified form provides a normally open bleed port between the pressure source and the independent fluid pressure system for permitting low rate flow communication therebetween to provide pressure equilization under predetermined conditions.

---

This invention relates to pressure transfer apparatus and more particularly relates to apparatus for transferring fluid pressure between fluid systems.

It is one object of this invention to provide new and improved means for transferring fluid pressure between independent or substantially independent fluid systems.

It is a particularly important object of this invention to provide apparatus for transmitting fluid pressure from one pressure source to one or more independent fluid pressure systems.

It is still a further object of the invention to provide a fluid pressure transfer barrier for coupling a fluid pressure source with one or more independent fluid pressure systems without direct fluid communication between the systems and with the pressure source.

In accordance with a further object of the invention a fluid pressure transfer apparatus includes at least one flexible hollow member into which one fluid system communicates and enclosed within a chamber in communication with another fluid system whereby fluid pressure is transferred between the systems by flexing the hollow member without physical contact between the fluids in the system.

According to a further object a hydraulic safety device embodying the invention includes a pressure chamber having means for fluid communication with a pressure source, at least two flexible tubes or envelopes secured within the pressure chamber sealed both from each other and the chamber interior, and independent fluid communication means connecting into each of the envelopes whereby fluid pressure is transmitted from within the pressure chamber through both of the envelopes independently of each other into independent fluid systems connected into each of the envelopes.

In accordance with a further object of the invention the flexible sleeves or envelopes of a fluid pressure transfer apparatus are selectively communicated into the chamber enclosing them for purging trapped gas from the fluid systems connected to the apparatus.

In accordance with another object of the invention a modified form of fluid transfer apparatus includes flexible pressure transfer sleeves having bleed port means permitting fluid flow therethrough at a rate substantially below the rate through each flow passage communicating the interior of each of the transfer sleeves with its fluid pressure system to allow pressure equalization across each of the transfer sleeves under predetermined conditions while permitting the sleeves to substantially isolate the fluid pressure systems connected therewith from the pressure source for transmission of large pressure pulses from the source into the independent systems without corresponding fluid flow through the transfer sleeves or corresponding pressure equalization across the sleeves.

Additional objects and advantages of the invention will be readily apparent from the reading of the following description of a device constructed in accordance with the invention, and reference to the accompanying drawings thereof, wherein.

Figure 1:
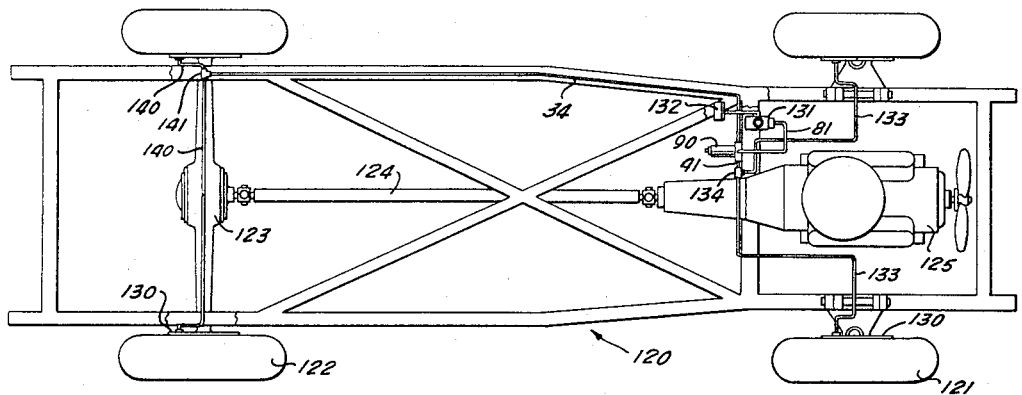
FIGURE 1 is a top plan view of an automobile chassis illustrating the application of apparatus embodying the invention to the hydraulic braking system of an automobile.

Referring to FIGURES 2–4 and 7 a pressure transfer unit 20 includes a housing 21 provided with a chamber 22 closed by a base member 23. The housing has a flange 24 secured to the base member by a plurality of bolts 25. The base member has a pair of substantially parallel spaced nipples 26 and 30 projecting into the chamber. A gasket 32 is disposed between the flange 24 and the base member 23 to seal the chamber. A fluid flow passage 33 is provided through the nipple 26 and base member communicating with a tube 34 connected into the base member by a coupling 35. Similarly, a separate fluid flow passage 40 is provided through the nipple 30 and base member and communicating with another tube 41 secured to the base member by a coupling 42.

A pair of flexible tubular pressure transfer sleeves 50 and 51 are disposed within the chamber 22 each telescoped along a lower end portion over the nipples 26 and 30, respectively. The sleeves are each formed of a suitable flexible material, such as a reinforced rubber or a suitable plastic, which freely flexes responsive to a pressure differential applied across it and which provides maximum resistance to chemical and physical action of fluids both within and around them. The sleeves also are telescoped along upper end portions over downwardly extending substantially parallel nipples 52 and 53, respectively, formed in spaced relation on a head member 54 disposed within the chamber 22. Spaced, separate, fluid flow passages 55 and 60 are provided through the head member and the nipples 52 and 53, respectively, communicating with the interior of the sleeves 50 and 51, respectively.

Figure 4:
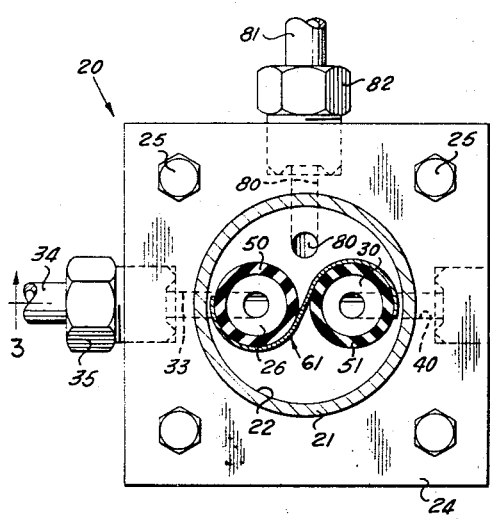
FIGURE 4 is a view partially in section and partially in elevation along the line 4—4 of FIGURE 3.
Figure 2:
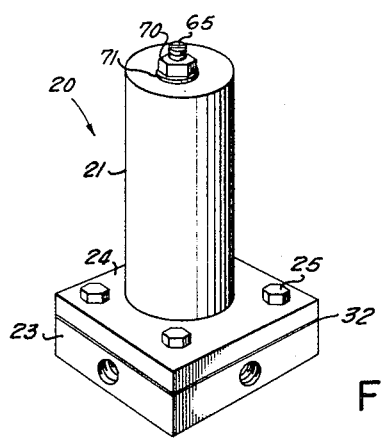
FIGURE 2 is a perspective view in elevation of a fluid pressure transfer unit embodying the invention.
Figure 3:
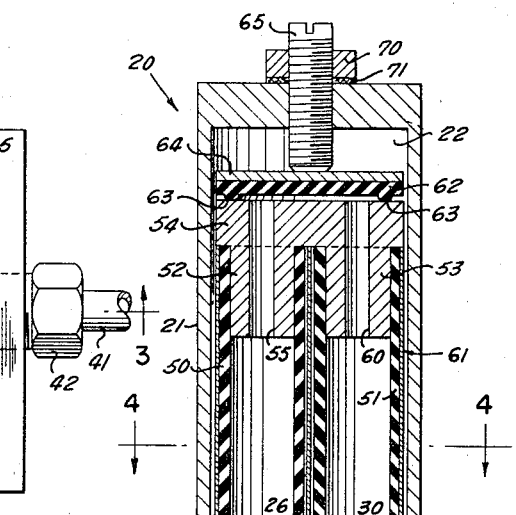
FIGURE 3 is a longitudinal view in section of a fluid transfer unit embodying the invention.
Figure 7:
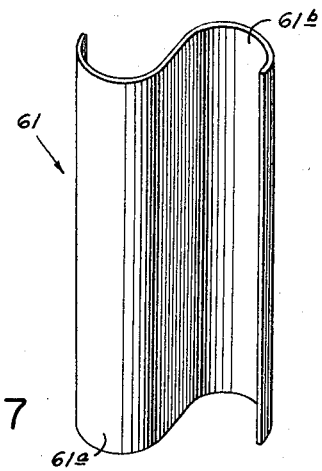
FIGURE 7 is a perspective view of a spacer member employed in the pressure transfer units shown in both FIGURES 3 and 5 to support the transfer sleeve head member from the base member.

The head member is held in longitudinal spaced relation relative to the base member 21 by a spacer 61, FIGURE 7, which is S-shaped in cross section comprising integrally connected longitudinal generally half-cylinder portions 61a and 61b the inside surfaces of which conform respectively to the contours of the external surfaces of the transfer sleeves 50 and 51. As seen in FIGURE 4, the longitudinal portions of 61a and 61b of the spacer 61 each encompass a longitudinally extend-half-section of one of the sleeves 50 and 51. The spacer is of a length such that the head member is held at a position relative to the base member which limits each sleeve against longitudinal expansion or contraction while leaving it exposed to fluid pressure within the chamber 22 to flex laterally for transmitting fluid pressure changes from around the sleeve into fluid within it. The half-cylindrical portions 61a and 61b each fit in close relationship around its respective pressure transfer sleeve though not actually secured to the sleeve and thus fluid penetrates between the outer surface of each sleeve and the half-cylindrical portion of the spacer disposed along such surface. As shown in both FIGURES 3 and 4, the sleeves and spacer are positioned within the chamber in spaced relation from the inside cylindrical surface of the housing 21 so that the outside surfaces of the sleeves and spacer are exposed to fluid within the chamber over their entire lengths.

A seal member 62 having downwardly depending integral circumferentially spaced support tips 63 is held against the head 54 by a pressure plate 64 engaged by a set screw 65 which is limited against rotation by a lock nut 70. A gasket 71 is disposed between the lock nut and the housing 21 around the set screw. At the position of the seal member 62 illustrated in FIGURE 3 the tips 63 support the member in spaced relation above the upper end surface of the head 54 for fluid communication between the flow pasages 55 and 60 and the chamber 22 for purposes of purging gas from the fluid systems connected to the unit 20, as discussed in detail hereinafter. The set screw 65 is rotated to force the pressure plate 64 downwardly compressing the seal member 62 until it is fully engaged in sealed relationship over the top end surface of the head preventing fluid communication into either of the passages 55 and 60 thereby isolating the interiors of the pressure transfer sleeves from each other and from the chamber 22. The seal member 62 is made of a sufficiently resilient material that it is readily compressible to the extent necessary to effectively seal over the ends of the passages 55 and 60 on the top surface of the head member and when released by retracting the set screw 65 expands sufficiently for the tips 63 to space the seal member from the head member to effect fluid communication from the chamber 22 into the passages 55 and 60 through space between the seal and head member.

The base member 23 is provided with a flow passage 80 opening into the lower end of the chamber 22 through the top surface of the base member, FIGURE 4. A tubing 81 is connected by a fitting 82 into the base member communicating with the flow passage 80 whereby fluid communication is provided through the tubing into the chamber 22 around the pressure transfer sleeves from a fluid pressure source, not shown.

In operation the pressure transfer unit 20 functions to transmit fluid pressure from a source, not shown, through the tube 81 to separate independent fluid systems, not shown, connected with the tubes 34 and 41 without direct fluid communications either between the pressure source and the separate fluid systems or between the fluid systems themselves so that a failure such as a leak in one of the systems does not render the other system inoperative. The pressure transfer unit is useful in numerous applications where separation of fluids in interconnected systems is desired and where prevention of the failure of one system from rendering an interconnected system inoperative is the objective. For example, the pressure transfer unit is useful to transfer pressure between systems having fluids which preferably are not mixed. The unit is also used to protect instruments in a system such as pressure gauges which are protected from the corrosive influence of certain fluids from which a pressure reading is required. The pressure transfer unit is interposed between the pressure gauge and the fluid system containing the corrosive fluid. Also, the pressure transfer unit is useful where a fluid pressure reading of an explosive fluid is desired without exposing the pressure gauge supplying the reading to the explosive fluid.

When used to transmit fluid pressure from one source to two connected fluid systems, the transfer unit 20 is connected by line 81 to a fluid pressure source, not shown, and the lines 34 and 41 are similarly connected with fluid systems, not shown, with which pressure communication is desired. The pressure source system and the fluid systems connected with the lines 34 and 41 are filled with the desired fluids, such as hydraulic fluid. Gas, such as air, trapped within the fluid systems connected with the unit is purged from the systems by releasing the seal member 62 and flowing the hydraulic fluid from the pressure source through the chamber into the systems connected to the lines 34 and 41 until the gas is eliminated. The set screw 65 is rotated releasing the pressure plate 64 sufficiently for the seal member 62 including its foot members 63 to expand moving the seal member to a spaced position on the head member, FIGURE 3, so that the flow passages 55 and 60 leading from within the pressure transfer sleeves communicate around the seal member into the chamber 22. Fluid then flows from the chamber into the interior of the pressure transfer sleeves and through the lines 34 and 41 to the systems connected with them until the gas is eliminated.

After the removal of the trapped gas, the system is operative to transmit pressure changes from within the chamber 22 through the sleeves 50 and 51 into the systems connected with them through the lines 34 and 41 without physical mixing of the fluids either from the chamber into the sleeve or between the sleeves themselves. The pressure within the chamber 22 is increased from its source through the line 81. The pressure increase in the chamber 22 is applied over the outside wall surfaces of the pressure transfer sleeves between the head and base member. The pressure transfer sleeves both flex laterally inwardly each expelling the fluid within it through the lower flow passage communicating through its lower nipple and the base member 23. For example, the increase in the pressure in the chamber forces the pressure transfer sleeve 50 laterally inwardly between the upper and lower nipples 52 and 56 with fluid within the sleeve being expelled through the flow passage 33 and the tube 34 into the fluid system to which the tube is connected. The extent to which the transfer sleeves collapse inwardly is, of course, dependent upon such factors as sleeve design and the volume of expelled fluid which can be accepted by the fluid system connected into the sleeve. Preferably, the sleeve does not fully collapse in normal pressure transfer service. The pressure applied around the sleeve is transmitted directly through the medium of the sleeve to the fluid within the sleeve and is then transmitted through that fluid in the passages 33 and the tube 34 to whatever means, such as a pressure gauge, not shown, is connected with the tube 34. Similarly, the pressure increase is correspondingly transmitted through the pressure transfer sleeve 51 into the fluid within the sleeve and therethrough in the flow passage 40 and the tube 41 to whatever means is connected with the tube 41.

Thus, pressure increases within the chamber 22 are transmitted through both the sleeves 50 and 51 without physical contact between the fluid in the chamber 22 and the fluids within the sleeves 50 and 51 and also without contact between the fluids within the sleeves. When the pressure is reduced within the chamber 22 the pressure differentials across the sleeves are correspondingly reduced so that the sleeves expand radially outwardly until equilibrium is established across the sleeve, as by return to a condition of no pressure differential across them at which time the sleeves return to the relaxed condition illustrated in FIGURE 3.

If a leak develops in one of the systems, the other systems connected with the pressure transfer unit are not affected by such leak. The leaking system does not cause a loss of fluids into it from either of the other systems. For example, if a leak develops in the tube 41 while pressure is being applied within the chamber 22 from the pressure source connected thereto the fluid within the system connected through the line 41 into the sleeve 51 is lost from the system causing the sleeve 51 to be fully contracted inwardly by the pressure within the chamber 22. Since the interior of the sleeve 51 is completetly sealed from the chamber 22 and is independent of the sleeve 50, the loss of the fluid and pressure within the system connected with the sleeve 51 does not permit fluid from the chamber 22 or from within the sleeve 50 to be lost and does permit continued transmission of pressure changes within the chamber 22 into the non-leaking system connected to the tube 34 through the pressure transfer sleeve 50 which remains operative. A pressure source connected with the chamber 22 through the line 81 must, of course, be capable of transmitting sufficient fluid into the chamber to fill the void occasioned in the chamber by the contraction of the sleeve 51 when the tube 41 breaks so that sufficient additional volume of fluid may still be pumped through the tube 81 to effect desired pressure transmission from the chamber 22 through the continuing operative transfer sleeve 50.

Figure 5:
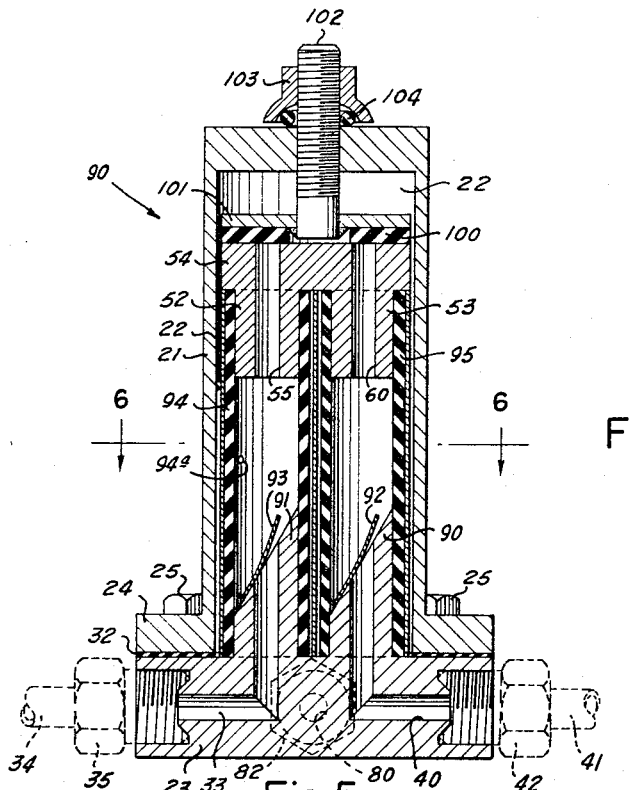
FIGURE 5 is a longitudinal view in section of an alternate form of fluid transfer unit embodying the invention.
Figure 6:
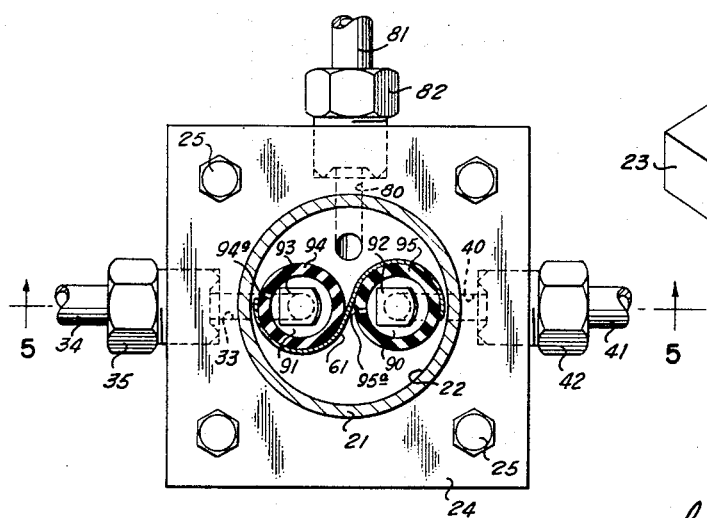
FIGURE 6 is a view in section and elevation along the line 6—6 of FIGURE 5.
Figure 8:
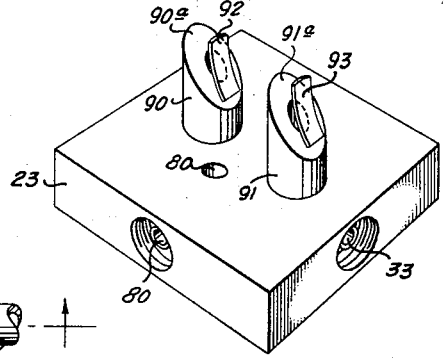
FIGURE 8 is a view in perspective of the base assembly of the pressure transfer unit illustrated in FIGURE 5; and, FIGURE 9 is a fragmentary view in section and elevation similar to FIGURE 6 showing alternate orientation of the lower pressure transfer sleeve nipples of the unit illustrated in FIGURES 5, 6 and 8.

A modified pressure transfer unit 90 preferred in braking systems is illustrated in FIGURES 5, 6 and 8, wherein identical components to those shown and rescribed in the transfer unit 20 are referred to by the same reference numerals. The fluid pressure transfer unit 90 includes the base 23 supporting and housing 21 having the flange 24 secured to the base by the bolts 25. The housing has the chamber 22 which is sealed around its lower end between the flange 24 and the base by the gasket 32.

A pair of upwardly extending spaced lower nipples 90 and 91 are formed on the base 21 projecting into the chamber 22. The nipples are provided with sloping upper end surfaces 90a and 91a through which the fluid flow passage 33 and 40, respectively, open. A reed type closure member 92 is suitably secured, as by silver soldering, along its lower end portion to the upper end surface 90a of the nipple 90 for bridging over the upper end of the flow passage 33. Similarly, a reed type closure member 93 is suitably secured along its lower end portion to the upper end surface 91a of the nipple 91 bridging over the upper end of the flow passage 40. Neither of the reed closure members is movable to a closed position in its nipple face during normal operation of its transfer sleeve but rather closes only when the sleeve collapses against it. Each of the reed closure members functions to prevent extrusion of the transfer sleeve around it into its nipple flow passage when a leak causes collapse of the sleeve and the pressure in the chamber 22 is high enough to force the sleeve against the nipple. The tube 34 is connected by the fitting 35 into the base member communicating with the flow passage 33. Similarly, the tube 41 is connected by the fitting 42 into the base member providing fluid communication into the flow passage 40.

A fluid pressure transfer sleeve 94 is telescopically fitted along a lower end portion on the nipple 91 while similarly a pressure transfer sleeve 95 is telescoped along a lower end portion over the nipple 90. The sleeves 94 and 95 are telescoped along upper end portions over the nipples 52 and 53 depending from the head member 54.

The upper end of the flow passages 55 and 60 in the head member 54 is closed by an annular seal member 100 which is held on the upper end face of the head member by a pressure plate 101 secured on a lower end portion of the set screw 102 which is threaded through the head end of the housing 22. The set screw is locked against rotation by a nut 103 which holds the ring seal 104 around the set screw to prevent leakage from within the chamber 31.

The pressure transfer sleeves are provided with bleed ports 94a and 95a, respectively, for effecting pressure equalization across the transfer sleeves under conditions discussed below. Each of the bleed ports is substantially smaller than the flow passage leading to its sleeve through the nipple connected thereto to permit some pressure equalization across each sleeve without any substantial effect on the collapse of either of the sleeves responsive to a leak in the hydraulic system connected into the sleeve. Each of the bleed ports is located in its sleeve at a position along its length which causes the port to be closed by an inside surface portion of the sleeve opposite the port when the sleeve fully collapses. Each sleeve collapses principally over its largest unsupported portion along the sleeve side facing the sloping surface or adjacent to the lower portion of the sloping surface of its lower nipple. Thus, the portion of each sleeve in which its bleed port is positioned collapses toward the other side of the sleeve.

Gas is purged from the pressure transfer unit 90 and the hydraulic systems connected to it in the same manner as in the pressure transfer unit 20. The set screw 102 is retracted by rotation of the nut 103 relaxing the force of the pressure plate 101 on the seal member 100 so that the seal is broken between the seal member and the top surface of the head 54 around the flow passages 55 and 60. Fluid flows from the chamber 31 into the pressure transfer sleeves 94 and 95. After the gas is purged from the systems connected with the pressure transfer unit, the set screw 102 is again tightened forcing the pressure plate 101 against the seal member 100 to re-establish a seal between the seal member and the head 54 again isolating the hydraulic systems connected with each of the pressure transfer sleeves both from each other and from the chamber 22.

The pressure transfer unit 90 functions in substantially the same manner as the transfer unit 20 and is particularly adapted to use in an automotive braking system as illustrated schematically in FIGURE 1. Referring to FIGURE 1, a conventional automotive chassis 120 includes front wheels 121 and back wheels 122 which are driven through a differential 123 actuated by a drive shaft 124 extending to an engine 125. The front wheels are each equipped with a conventional hydraulically actuated braking unit 130 while the rear wheels similarly are each equipped with an identical braking unit. The pressure transfer unit 90 is connected by its tube 81 to a master cylinder unit 131 having a brake pedal 132. The front wheel brake units 130 are connected into the pressure transfer unit by tubes 133 which are secured through a fluid coupling 134 to the tube 41 of the pressure transfer unit. Similarly, the rear wheel brake units are connected by lines 140 and a coupling 141 which communicates with the line 34 also leading to the pressure transfer unit 90. Thus, the front braking units are in fluid communication into the pressure transfer sleeve 95 while the rear braking units similarly are in fluid communication into the pressure transfer sleeve 94.

When the brake pedal 132 is depressed the master cylinder unit 131 pumps hydraulic fluid through the tube 81 into the chamber 22 of the pressure transfer unit through the flow passage 80 in its base member 23. As the fluid flows into the chamber 22 the pressure increases within the chamber around the pressure transfer sleeves. The longitudinal portions of each of the pressure transfer sleeves between the nipples on which they are secured are flexed inwardly forcing the fluid within each of the sleeves outwardly through the flow passage leading through its lower nipple. For example, the pressure transfer sleeve 94 is collapsed inwardly between its upper nipple 52 and lower nipple 91 forcing fluid within it outwardly through the flow passage 33 and the tube 34 into the rear brake units 130 actuating brakes on the rear wheels. The flow capacity of the passage 33 so far exceeds the capacity of the bleed port 94a that the pressure transfer sleeve responds immediately when subjected to the increased pressure within the chamber 22 with little fluid flow occurring through the bleed port 94a. When sufficient volume of fluid has been expelled from within the transfer sleeve the sleeve is partially collapsed or flexed inwardly. The brake units 130 are of a conventional type including spring loaded pistons which are displaced by the fluid forced from within the pressure transfer sleeve so that the volume of fluid moved from the pressure transfer unit through the line 34 to the brake unit is accommodated at the brake unit by the movement of the piston in the brake units in actuating the brakes on the wheels. The front wheel brake units are simultaneously actuated in an identical manner by the same fluid pressure acting on the pressure transfer sleeve 95.

When the brake pedal on the master cylinder unit is released allowing the master cylinder to return to its normal position and reducing the pressure within the chamber 22 the pressure from the chamber transmitted through the flexible transfer sleeves is correspondingly reduced whereby the piston spring in each of the brake units overcomes the force of the fluid pressure in the brake unit cylinder relaxing the brakes and returning the brake unit piston to its normal position to displaced fluid through the lines 141 and coupling 140 into the tube 34 and through the line 133 from the front wheel brakes into the tube 41 to the pressure transfer unit. The fluid flowing back to the pressure transfer unit enters the pressure transfer sleeves expanding them back outwardly to their normal positions as illustrated in FIGURE 5. The rate of flow of the fluid returning into the pressure transfer sleeves through the passages 33 and 40 substantially exceeds the flow rate through the sleeve bleed ports and thus there is a minimum of fluid transmitted through the bleed port. Upon complete relaxation of the pressures transmitted both from the master cylinder and from the cylinders of the brake units any pressure differential which may remain across the pressure transfer sleeves is equalized through their bleed ports 94a and 95a. The flow rate through the bleed ports is, however, so small that it does not affect the functioning of the flexible pressure transfer sleeve as a barrier to keep the braking system of the front and rear wheels substantially independent of the master cylinder braking system and of each other. The bleed ports serve as adjusting function in equalizing the pressures between the interior of the pressure transfer sleeves and the chamber 22 so that a progressive pressure build-up does not occur in either wheel braking system which might tend to lock the brakes on the wheels. Such a pressure build-up can occur from the heating of the hydraulic fluid within the braking system which expands it and may thus move the pistons of the brake units to actuate the brake if the additional volume of the fluid due to its heating is not accommodated by the transfer and pressure equalization through the bleed ports.

If a leak occurs in the braking system of the rear wheels, fluid is lost from the system permitting flow of the fluid from within the pressure transfer sleeve so that as the pressure is increased within the chamber 22 by the brake pedal the pressure transfer sleeve 94 is collapsed to the maximum extent permitted by the sleeve. A portion of the inside surface of the sleeve around the bleed port 94a is collapsed against an opposite wall portion of the sleeve sealing off the bleed port to prevent any fluid flow through it from the chamber 22 so that fluid within the master cylinder system does not flow through the pressure transfer sleeve 94 into the leaking rear wheel brake system through the line tube 34 but is still available to operate the brakes of the non-leaking system. When the transfer sleeve collapses it engages the reed closure member 93 which is forced against the nipple surface 91a over the open end of the flow passage 33. The reed member prevents extrusion of any portion of the transfer sleeve into the nipple flow passage.

The front wheel brake system responds in a manner identical to the rear wheel brake system if a leak occurs in the system so that the transfer sleeve 95 collapses if hydraulic fluid is lost by a front brake unit.

The fluid volume of the pressure transfer sleeves 94 and 95 are so related to the master cylinder system that when one of the pressure transfer sleeves is collapsed to its maximum degree due to a leak in one of the braking systems sufficient pressure may still be applied by the master cylinder to actuate the other braking system through its pressure transfer sleeve. Thus, when a leak occurs such as in the rear wheel brake system permitting substantially complete collapse of the transfer sleeve 94, the pressure within the chamber 22 continues to act on the transfer sleeve 95 to operate the front wheel brakes even though the rear wheel brake system has ceased to operate due to the loss of its hydraulic fluid.

It will now be seen that a new and improved apparatus for fluid pressure transmission between separate independent fluid systems has been described and illustrated.

It will further be seen that new and improved apparatus for transmitting fluid pressure from one pressure source to one or more independent fluid systems connected therewith has been described and illustrated.

It will be additionally seen that a new and improved safety barrier for hydraulic systems has been described and illustrated wherein hydraulic fluid pressure from one source is transmitted into one or more hydraulic systems which are independent of the pressure source and of each other.

It will also be seen that a new and improved fluid pressure barrier has been described and illustrated wherein fluid systems are interconnected to permit pressure transmission therebetween while isolating the fluids in each of the systems from each other.

It will be further seen that fluid pressure transfer apparatus embodying the invention includes housing means providing a pressure chamber connected with one fluid system and a hollow flexible member supported within the chamber connected with another fluid system independent of the first fluid system and expansible and contractable responsive to the pressure differential across the member for transmitting pressure changes between the systems without physical contact or mixing of the fluids in each of the systems.

It will also be seen that a hydraulic safety device embodying the invention includes a pressure chamber having means for fluid communication with a pressure source, two flexible hollow members disposed within the pressure chamber sealed from each other and from the interior of the chamber, and fluid communication means for connecting fluid systems into each of the flexible members whereby fluid pressure changes within the pressure chamber of the fluid systems connected with each of the members without physical contact between fluid within the chamber and the fluids within each of the independent fluid systems connected into the flexible members disposed within the chamber.

It will be further seen that means are provided for selectively communicating the flexible members with the pressure chamber for purging gas from the fluid systems connected to the fluid pressure transfer apparatus.

It will additionally be seen that an alternate form of fluid pressure transfer apparatus embodying the invention includes flexible pressure transfer sleeves each of which has a bleed port which permits pressure equalization across each of the sleeves under predetermined pressure conditions without affecting the pressure transfer function of the sleeves and while retaining substantially complete isolation of fluid within the pressure chamber around the sleeves from fluid within the sleeves and isolation of the fluids within the sleeves from each other.

Each of the pressure transfer units may be altered in numerous obvious ways. For example, in place of the spacer 61 the head member 54 may be held in spaced relation to the base member by suitable structures such as longitudinal rod connectors or a tubular member encompassing the sleeves and inlet passage opening 80. Also, the nipples on the base and head members may be separate rather than integral members.

Figure 9:
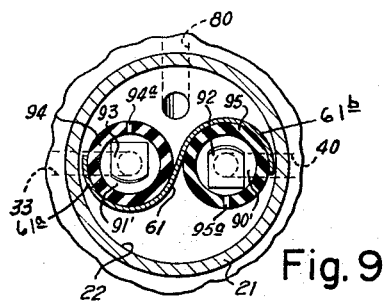

FIGURE 9 illustrates an alternate form of the pressure transfer unit 90 in which its lower nipples are oriented to position the major unsupported portion of each of the transfer sleeves opposite the portion of the spacer extending along the sleeve so that each sleeve collapses directly toward its spacer portion. The nipples 90' and 91' of FIGURE 9 correspond in all respects except orientation with the nipples 90 and 91, respectively. The nipples 90' and 91' are each aligned 90 degrees in opposite directions from the orientation of the nipples 90 and 91. All other components and features of such components of the alternate form of transfer unit shown in FIGURE 9 are identical to the pressure transfer unit 90 of FIGURES 5, 6 and 8 and thus are referred to by the same reference numerals. Specifically, referring to FIGURE 9, the nipple 90' is positioned on its base with its end surface 90a facing opposite the flow passage 80 and toward the spacer portion 61b extending along the pressure transfer sleeve 95. The bleed port 95a of the pressure transfer sleeve 95 is aligned directly opposite both the spacer portion 61b and the nipple end surface 90a. The nipple 91' is oriented with its sloping end surface 91a facing the direction of the flow passage 80 opposite to the position of the spacer portion 61a. The pressure transfer sleeve 94 on the nipple 91' has its bleed port 94a at a position directly opposite the end surface 91a and the spacer portion 61a. Thus, the end surfaces of the nipples 90' and 91' face opposite directions and the major unsupported portion of each of the pressure transfer sleeves is opposite the spacer portion extending along the sleeve. The major unsupported portion of each sleeve is fully exposed to the pressure within the chamber 22 at all times so that each sleeve collapses directly toward its spacer portion.

It will be seen that in a further modified form of pressure transfer unit embodying the invention the lower nipples are aligned so that the major unsupported portions of their pressure transfer sleeves are each positioned opposite the spacer member portion extending along the minor unsupported portion of each pressure transfer sleeve.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. Fluid pressure transfer apparatus comprising: means providing a chamber; means providing a flow passage for supplying fluid under pressure into said chamber; flexible envelope means supported within said chamber having outside surface portions exposed in said chamber to fluid pressure within said chamber outside said envelope means; and flow passage means for fluid communication into said envelope means independent of fluid in said chamber around said envelope means; and normally open bleed port means provided in said envelope means and having a flow capacity substantially less than the flow capacity of said flow passage into said envelope means for pressure equalization between said chamber and within said envelope means.

2. Fluid pressure transfer apparatus as defined in claim 1 including resilient closure means covering said flow passage into said envelope means for preventing extrusion of said envelope means into said flow passage responsive to collapse of said envelope means against said closure means.

3. Fluid pressure transfer apparatus as defined in claim 2 including spacer means within said chamber between said closure member and said head member for supporting said head member in fixed spaced relation to said closure member to hold said sleeve means against longitudinal contraction while permitting lateral contraction of said sleeve means.

4. Fluid pressure transfer apparatus comprising: a housing provided with a chamber open at one end; a closure member secured with said housing closing said open end of said chamber; means providing a fluid flow passage into said chamber; flexible sleeve means connected at one end with said closure member; said closure member having fluid flow passage means therein communicating into said sleeve means; a head member connected with the other end of said sleeve means and having flow passage means therein for communicating the inside of said sleeve means with said chamber; seal means engageable with said head member for closing said flow passage means therein to prevent fluid communication between said chamber and the interior of said sleeve means; and means on said housing operatively engageable with said seal means for moving said seal means to sealing engagement with said head member.

5. Fluid pressure transfer apparatus as defined in claim 4 wherein said sleeve means is provided with a bleed port having a flow capacity substantially less than the flow capacity of said flow passage means leading into said sleeve means through said closure member.

6. A fluid pressure transfer apparatus as defined in claim 5 including closure means associated with said closure member for closing off said flow passage means into said sleeve means responsive to a force applied by said sleeve means to said closure means upon collapse of said sleeve means.

7. Fluid pressure transfer apparatus comprising: a housing having a chamber open at one end; a base member secured to said housing closing said open end of said chamber; said base member having a first flow passage means therethrough into said chamber; nipple means formed on said base member extending into said chamber; flexible sleeve means secured along one end portion over said nipple means; said base member and said nipple means being provided with second fluid flow passage means opening into said flexible sleeve means; a head member supported within said chamber and having nipple means secured within the other end portion of said sleeve means; said head member and said nipple means thereon having flow passage means communicating into said sleeve; spacer means between said base member and said head member within said chamber for holding said head member at fixed longitudinal relationship with said base member to hold said sleeve means against longitudinal contraction while permitting lateral contraction; a seal member engaegable with said head member to close said flow passage means into said sleeve means sealing the interior of said sleeve means from said chamber; and means secured with said housing for supporting said seal member in sealed relationship on said head member and releasing said seal member to permit fluid flow between the interior of said sleeve means and within said chamber around said sleeve.

8. Fluid pressure transfer apparatus as defined in claim 7 wherein said sleeve means includes two sleeves independently supported in parallel spaced relation within said chamber between said base and head members, said nipple means on said base member is a pair of spaced nipples each secured in one end of one of said sleeves, and said nipple means of said head member is a pair of spaced nipples each secured in the other end of one of said sleeves.

9. Fluid pressure transfer apparatus as defined in claim 7 wherein said sleeve means is provided with a bleed port communicating the interior of said sleeve means with said chamber, said bleed port having a flow capacity substantially less than the flow capacity of said flow passage means through said base member and said nipple means into said sleeve means and said port being positioned in said sleeve means whereby said port is closed to fluid flow by an internal surface portion of said sleeve means opposite said port upon lateral contraction of said sleeve means responsive to fluid pressure within said chamber.

10. Fluid pressure transfer apparatus as defined in claim 9 including a closure member on said nipple means of said base member for closing said flow passage means through said nipple means into said sleeve means responsive to collapse of said sleeve means to prevent extrusion of said sleeve means into said flow passage means.

11. Fluid pressure transfer apparatus as defined in claim 10 wherein said nipple means on said base member has a tapered end surface along which said valve member is supported.

12. A fluid pressure transfer unit comprising: a housing having a head end and a base end and provided with a chamber open at said base end, said housing having an outwardly extending flange around said base end; a base member secured to said flange of said housing closing said chamber in said housing; a seal between said base member and said flange of said housing to prevent fluid leakage from said chamber between said base member and said flange; a pair of nipples on said base member projecting in substantially parallel spaced relationship into said chamber each spaced from the side wall thereof; each of said nipples being provided with a fluid flow passage extending independently of each other through said base member; a head member disposed within said chamber spaced from said base member and having a pair of substantially parallel spaced nipples each having a flow passage extending through said head member; a pair of spaced flexible sleeves in said chamber each secured along one end portion on one of said nipples on said base member and along the other end portion on one of said nipples on said head member; a longitudinal spacer between said head member and said base member holding said head member at a fixed position relative to said base member; a seal member engageable with said head member over said flow passages therethrough for sealing the interior of said sleeves from said chamber; a pressure plate engageable with said seal member for holding said seal member on said head member; a set screw engaged at one end within said chamber with said pressure plate and extending through the head end of said housing for supporting and moving said pressure plate between one position for holding said seal member in sealed relationship on said head and another position for releasing said seal member from sealed relationship on said head to permit fluid communication from within said sleeves through said flow passages in said nipples and said head member into said chamber for purging gas from hydraulic systems connected with said sleeves; a lock nut on said set screw for holding said screw against rotation relative to said head of said housing; a seal between said lock nut and said head of said housing for sealing around said set screw; and said base member being provided with a flow passage extending therethrough into said chamber of said housing exterior of said sleeves for conducting fluid into said chamber around said sleeves.

13. A pressure transfer unit as defined in claim 12 wherein each of said sleeves is provided with a bleed port having a flow capacity substantially less than the flow capacity of said flow passage through said base member and said nipple on said base member into said sleeve, each of said bleed ports being positioned in its sleeve whereby said port is closed by an opposite wall portion of said sleeve when said sleeve is in a laterally collapsed condition.

14. A fluid pressure transfer unit as defined in claim 13 wherein each of said nipples on said base member is provided with closure means for closing said flow passage through said nipple responsive to collapse of the flexible sleeve over said nipple to prevent extrusion of said sleeve into said flow passage through said nipple.

15. A fluid pressure transfer unit as defined in claim 14 wherein each of said nipples on said base member has a tapered upper end surface.

16. A fluid pressure transfer unit as defined in claim 15 wherein said longitudinal spacer comprises a member having one longitudinally extending portion substantially encompassing one longitudinally extending half portion of one pressure transfer sleeve and another longitudinally extending portion of said spacer substantially encompassing an opposite longitudinally extending half portion of the other pressure transfer sleeve.

17. A fluid pressure transfer unit as defined in claim 16 wherein said lower nipples are oriented in opposite directions, each of said nipples is oriented with its sloping end surface facing away from the portion of the spacer portion extending along the transfer sleeve on said nipple.

18. A fluid pressure transfer unit as defined in claim 17 wherein said spacer is S-shaped in cross-section with one longitudinal substantially semi-cylindrical portion of said spacer encompassing a minor unsupported portion of one pressure transfer sleeve and the other longitudinal substantially semi-cylindrical portion of said spacer encompassing a minor unsupported portion of the other of said pressure transfer sleeves.

References Cited

UNITED STATES PATENTS 2,246,621  6/1941  Davis.
2,624,176  1/1953  Osborne.
2,860,486  11/1958  Berg et al.

MARTIN P. SCHWADRON, *Primary Examiner.*

ROBERT R. BUNEVICH, *Assistant Examiner.*

UNITED STATES PATENT OFFICE
CERTIFICATE OF CORRECTION

Patent No. 3,411,298                                   November 19, 1968

Max Sorensen

It is certified that error appears in the above identified patent and that said Letters Patent are hereby corrected as shown below:

Column 5, line 48, "in" should read -- on --. Column 7, line 46, "as" should read -- an --. Column 8, line 55, after "chamber" insert -- are transmitted through the flexible members into each --.

Signed and sealed this 17th day of March 1970.

(SEAL)
Attest:

Edward M. Fletcher, Jr.                         WILLIAM E. SCHUYLER, JR.
Attesting Officer                                      Commissioner of Patents